(12) United States Patent
Scherr

(10) Patent No.: US 6,799,248 B2
(45) Date of Patent: Sep. 28, 2004

(54) CACHE MANAGEMENT SYSTEM FOR A NETWORK DATA NODE HAVING A CACHE MEMORY MANAGER FOR SELECTIVELY USING DIFFERENT CACHE MANAGEMENT METHODS

(75) Inventor: Allan Scherr, Framingham, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 10/036,547

(22) Filed: Dec. 31, 2001

(65) Prior Publication Data

US 2002/0116585 A1 Aug. 22, 2002

Related U.S. Application Data

(63) Continuation of application No. 09/705,114, filed on Nov. 2, 2000, now abandoned, which is a continuation of application No. 08/659,482, filed on Jun. 6, 1996, now abandoned.

(51) Int. Cl.[7] .................. G06F 13/00; G06F 15/177
(52) U.S. Cl. ............ 711/118; 711/133; 709/220; 709/224
(58) Field of Search .................. 711/133, 134, 711/141, 142, 143, 159, 118; 709/220, 221, 223, 224

(56) References Cited

U.S. PATENT DOCUMENTS

| | | | |
|---|---|---|---|
| 3,577,185 A | 5/1971 | Belady | 711/159 |
| 4,928,239 A | 5/1990 | Baum et al. | 711/136 |
| 5,381,539 A | 1/1995 | Yanai et al. | 711/133 |
| 5,390,318 A | 2/1995 | Ramakrishnan et al. | 711/158 |
| 5,394,555 A | 2/1995 | Hunter et al. | 711/148 |
| 5,440,730 A | 8/1995 | Elmasri et al. | 711/159 |
| 5,537,571 A | 7/1996 | Deville | 711/133 |
| 5,611,049 A | 3/1997 | Pitts | 711/137 |
| 5,819,033 A | 10/1998 | Caccavale | 709/224 |

OTHER PUBLICATIONS

Willick et al, "Disk Cache Replacement policies for Network Fileservers," Proceedings 13th Int'l. Conf. on Distributed Computing Systems, May 25–28, 1993, pp. 2–11.*

(List continued on next page.)

Primary Examiner—Glenn Gossage
(74) Attorney, Agent, or Firm—George A. Herbster

(57) ABSTRACT

A network accelerator storage caching system manages a number of cache management systems and may be inserted at any point in a network to provide a configurable, scalable variety of cache management systems to improve perceived response time. Depending on the configuration(s) selected, a cache management system may manage data in a storage cache on the basis of time-currency, page usage frequency, charging considerations, pre-fetching algorithms, data-usage patterns, store-through methods for updated pages, a least recently used method, B-tree algorithms, or indexing techniques including named element ordering, among others. In a preferred embodiment the configurable cache management is embedded in the storage media, either as firmware in a storage controller or as software executing in a central processing unit (CPU) in a storage controller. In a preferred embodiment the network accelerator storage caching system provides security measures for protecting data and is dynamically configurable.

13 Claims, 17 Drawing Sheets

OTHER PUBLICATIONS

Korner, "Intelligent Caching for Remote File Service," Proceedings 1990 International Conference on Distributed Computing Systems, May 28–Jun. 1, 1990, pp. 220–226.*

O'Toole et al, "Shared Data Management Needs Adaptive Methods," Proceedings Fifth Workshop on Hot Topics in Operating Systems (HotOS–V), May 4–5, 1995, pp. 129–135.*

Netscape Press Release: "New Server Software Product Automatically Creates and Manages Corporate Online Info and Resources", Mar. 5, 1996, 3 pages USA.

Peter B. Danzig, "The Harvest Object Cache", Dr. Dobb's Journal, Apr. 1996, V21, N4, P70 (4); M& T Publishing, USA.

Anawat Chankhunthod et al., "A Hierarchical Internet Object Cache", Technical Report CU–CS–76–95, 13 pages, University of Southern California; University of Colorado, USA.

Udi Manber et al., "Glimpse, A Tool to Search Through Entire File Systems", Oct. 1993, Technical Report TR93–34, Department Computer Science, University of Arizona, USA.

C. Mic. Bowman et al., "Research Problems for Scalable Internet Resource Discovery", Tech Report CV–CS–643–93, Mar. 1993, University of Colorado, Department Computer Science, 12 pages, USA.

C. Mic Bowman et al., "Harvest: A Scalable, Customizable Discovery and Access System" tech Report CU–CS–732–94, Aug. 1994, University of Colorado, Department Computer Science, 28 pages, USA.

Peter B. Danzig, et al., "A Case for Caching File Objects Inside Internetworks", Tech Report CU–CS–642–93, Mar. 93, University of Colorado, Department Computer Science, 15 pages, USA.

Darren R., Hardy et al., "Harvest User's Manual" Tech Report CU–CS–743–94, Oct. 1994, University of Colorado, Department Computer Science, 89 pages, USA.

* cited by examiner

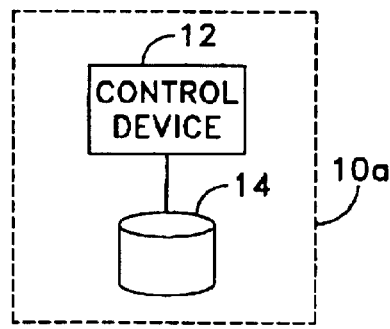
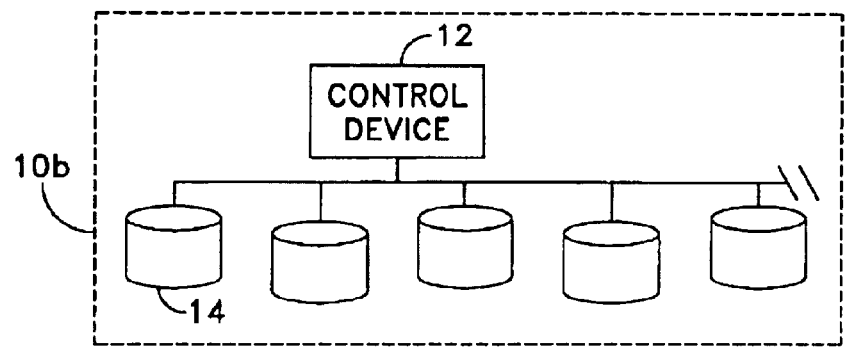
FIG. 1b
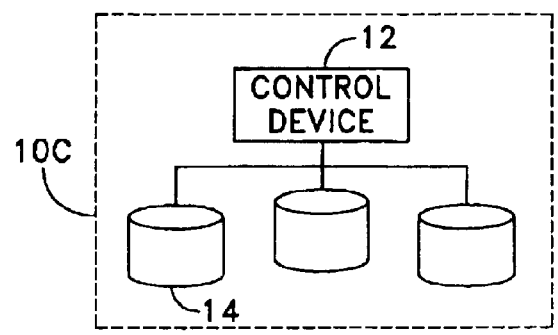

CACHE MANAGEMENT SYSTEM 10

CACHE MEMORY MANAGER 12

METHOD SELECTION MODULE
FIG. 2b — 101

MONITOR
FIG. 2a — 103

COMMAND SEND AND
RECEIVE MODULE — 104

CACHE MEMORY DEVICE 14

CACHE MEMORY MANAGEMENT
METHODS STORAGE
FIGS. 3–12 — 100

FIG. 1c

CRITERION1=STOCKNEWS, PAGENO.=10

IF [CRITERION1] IS EQUAL TO VALUE1 AT LOCATIONX IN PAGE_HEADER,
THEN PRE-FETCH [PAGENO.] PAGES,
ELSE, PROCESS TO NEXT STEP.

FIG. 11

OPENING HOUR=1000, CLOSING HOUR=1600, VALUE1=15

IF TIME_STAMP IN PAGE_HEADER IS GREATER THAN [OPENING HOUR] &
LESS THAN [CLOSING HOUR], REFRESH PAGE IF [VALUE1] MINUTES HAVE
ELASPED SINCE TIME-STAMP,
ELSE, PROCESS TO NEXT STEP.

FIG. 12

| PROTOCOL | DOMAIN | PORT | DIRECTORY PATH | OBJECT | SPOT |
|---|---|---|---|---|---|
| ftp | x.com | #### | hypertext/www addressing | /addressing.html | #SPOT |
| gopher | x.edu | | | | |
| http | x.gov | | | | |
| mailto | x.mil | | | | |
| news | x.net | | | | |
| t lnet | x.org | | | | |
| wais | | | | | |
| file | | | | | |

FIG. 13

| | TYPE | EXAMPLES |
|---|---|---|
| i | image | <IMG SRC="*http://www.siteone.com/sales/pictures/dem.gif> |
| ii | | <IMG SRC="*http://www.siteone.com/sales/pictures/dem.eps> |
| iii | | <IMG SRC="*http://www.siteone.com/sales/pictures/dem.jpeg> |
| s1 | sound | <A HREF="talk.au"> specification talk, 77k<A> |
| s2 | | <A HREF="talk.au"> specification talk, 77k<A> |
| v1 | video | <A HREF="tape.MPEG"> Video, 77k<A> |
| f1 | form | <FORM METHOD="POST" ACTION= "/cgi.usr-inf>.... |

FIG. 14

CACHE MANAGEMENT SYSTEM FOR A NETWORK DATA NODE HAVING A CACHE MEMORY MANAGER FOR SELECTIVELY USING DIFFERENT CACHE MANAGEMENT METHODS

CROSS REFERENCE TO RELATED APPLICATIONS

This application is a continuation of U.S. patent application Ser. No. 09/705,114 filed Nov. 2, 2000 (now abandoned) which is a continuation of U.S. patent application Ser. No. 08/659,482 filed Jun. 6, 1996 (now abandoned), which applications are assigned to the same assignee as this application.

BACKGROUND OF THE INVENTION

Field of the Invention

The invention relates generally to the field of networking and in particular to the field of using auxiliary storage systems such as disk drives as caches for performance improvements in networks.

As more users and more websites are added to the World Wide Web on the Internet, the content of the information transmitted on it also increases in complexity and quantity: Motion video, more complex graphics, audio transmissions, and so on, place rapidly increasing performance demands on the Internet at all points. The problem faced by service and content providers as well as users is how to maintain or improve performance for a growing user base without constantly creating the need for additional capacity or "bandwidth" in the network.

Websites and web browser software, such as provided by Netscape Communications Corporation (having a principal place of business in Mountain View, Calif.) on the World Wide Web (WWW)use storage systems such as magnetic disks to store data being sent and received, and most of these also use a simple form of disk caching at the website or at the user site to improve performance and minimize re-transmissions of the same data. These typically use a "least recently used" (LRU) algorithm to maintain the most recently referred to data in the disk cache and a protocol that permits a user to request that a page be refreshed even if it is in the cache. However, as the traffic continues to grow, this method needs to be improved upon to provide the performance that may be required.

Traffic increases as subsequent requests are made for web pages that had been sent earlier, but are no longer in the local user's system. The same re-transmission will occur at other points in the network, thus degrading overall response time and requiring additional network bandwidth. One approach that is frequently used to tackle the problem is the use of faster transmission media to increase bandwidth. This takes large capital and labor expense to install and may also require replacement of modems and other equipment at various nodes. Service providers that install faster transmission equipment must still match the speeds at which their users can send and receive data, thus bottlenecks can still occur that slow down performance and response times at the user's site.

Users who upgrade to faster transmission media may often have to scrap modems and other units that were limited to slower speeds. Somewhat less frequently, large-scale internal network wiring changes may need to be made, as well, often causing disruptions to service when problems are found during and after installation. With any of these changes, software changes may also be required at the user's site, to support the new hardware.

Despite the users' best efforts, a well-known phenomenon in network systems design, called the "turnpike" effect, may continually occur as users upgrade to faster transmission is media. As United States interstate highway builders first observed in the 1950's, when better, "faster" highways were made available, more people tended to use them than were initially anticipated. A highway might have been designed to handle a specific amount of traffic, based on then present patterns and data. But once people learned how much faster and smoother travel on the new highway was, traffic might increase to two or three times the original projections, making the highway nearly obsolete almost at the outset of its planned life.

Similar problems occur with users of the Internet and service and content providers. Many of the service providers and online system services have had difficulty adding systems and transmission links to keep up with such increases in traffic. As technology improves in all areas, content providers are providing more graphics, videos and interactive features that impose major new loads on the existing transmission systems. As companies and institutions install or expand local and wide area networks for their internal use, they are also linking them to Internet providers and sites, usually through gateways with "firewalls" to prevent unauthorized access to their internal networks. As these companies link their internal networks to the Internet and other external networks, usage and traffic on the Internet increases multi-fold. Many of these same companies and institutions are also content providers, offering websites of their own to others.

The content providers add to the problem of increased traffic in yet another way, when time-sensitive data is stored and transmitted. Stock quotes, for example, during the hours when a given exchange is open, are highly time sensitive. Web pages containing them or other market information need to be updated frequently during trading hours. Users who are tracking such quotes, often want to insure that they have the latest update of the web page. If standard Least Recently Used (LRU) caching algorithms are used at the user site and this web page is in constant use, the cached copies may not be refreshed for several cycles of stock price changes: Here, caching data works to the user's disadvantage.

However, once that exchange closes, there should be no updates until the following business day. For the high-volume, high-visibility exchanges, this means traffic can reach peaks of congestion during trading hours. The network capacity used to keep up with this may lie dormant during off-peak hours. Most existing service and content providers on the Internet do not, at present, have an effective way to differentiate between these service levels in their prices or service offerings.

Private dial-up services, such as WESTLAW® of West Licensing Corporation or LEXIS/NEXIS® of Reed Elsevier or COMPUSERVE® of CompuServe, Incorporated or AMERICA ONLINE® (AOL®) of America Online, Incorporated, have been able to offer differentiated pricing for networked access to certain kinds of data in their proprietary databases, but doing this is greatly simplified when the choices are limited and relatively few in number. In most cases this is done on the basis of connect time and perhaps some additional fee per database accessed.

Data management methods, such as least recently used caching, can be applied to proprietary databases as well.

Usually only one form of data or cache management is associated with a database, and the choice of a particular method of data and cache management has historically been based on the type of file being created.

On the Internet, by contrast, data requests can come from anywhere in the world for almost any topic in the world, to any content provider in the world. Patterns of access and timeliness requirements vary greatly from user to user. An educational institution that provides Internet services to its students and faculty will have one set of needs for access, and response times, while a business corporation user may have a completely different set of needs.

Access to data on the Internet also differs from dial-up access to proprietary databases in another way. The private dial-up service provider may not change the services offered for months or even years at a time. Data files may be updated, but the kinds of information that can be obtained may remain constant.

On the Internet, the opposite is true. Information that was not available three months ago anywhere in the world may now be available from several different sources. This is also true for the format of the information. In less than a three year time span, web pages have gone from text only, to text plus drawings, then to text plus high-resolution photographic-like images in several different formats. Sound is also available now from many sites. Web browsers now permit use of videos and interactive forms. Traditional network and data management techniques are hardpressed to keep up with these changes.

SUMMARY OF THE INVENTION

It is an object of the present invention to provide a method and apparatus for improving network response time at one or more sites or nodes while reducing the amount of bandwidth used to carry a given load.

Another object of the present invention is providing improvements in network response time without requiring any changes in transmission media and transmission equipment.

Still another object of the present invention is providing a flexible method and apparatus for providing response time improvements that can readily be adjusted to different usage patterns.

A further object of the present invention is providing a method and apparatus that permits a service or content provider to offer differentiated levels of service and prices based on the type of data being transmitted.

These and other objects are achieved by a network accelerator storage caching system that may be inserted at any point in a network, to provide a configurable, scalable variety of cache management systems to improve response time. Depending on the configuration(s) selected, the system may manage data or subsets of data in a storage cache on the basis of time-currency, page usage frequency, charging considerations, pre-fetching algorithms, data-usage patterns, store-through methods for updated pages, least recently used method, B-tree algorithms, or indexing techniques including named element ordering, among others. A preferred embodiment may embed the configurable cache management in the storage media, either as firmware in a storage controller or as software executing in a central processing unit (CPU) in a storage controller. In a preferred embodiment the system may be scaled in size and offer security for protected data.

It is an aspect of the present invention to provide improvements in response times.

It is another aspect of the present invention to reduce the bandwidth required in the vicinity of the invention to transmit information responsively.

Another aspect of the present invention is to enable configuring at each site to use the cache method(s) preferred by that site.

A further aspect of the present invention is allowing a site to trade storage space for transmission capacity or bandwidth.

BRIEF DESCRIPTION OF THE DRAWINGS

FIG. 1b depicts alternative embodiments of a cache management system shown in FIG. 1a.

FIG. 1c depicts the general organization of a cache management system.

FIG. 11 is a block diagram of scripted variables and pseudo-code for a pre-fetch method of cache management used in the present invention.

FIG. 12 is a block diagram of scripted variables and pseudo-code for a time sensitive method of cache management used in the present invention.

FIG. 13 is a table showing the elements of a Uniform Resource Locator (URL).

FIG. 14 is table showing some of the named elements that can be included in hyper-text markup language (HTML) pages.

DETAILED DESCRIPTION OF THE INVENTION

Figure 1A:
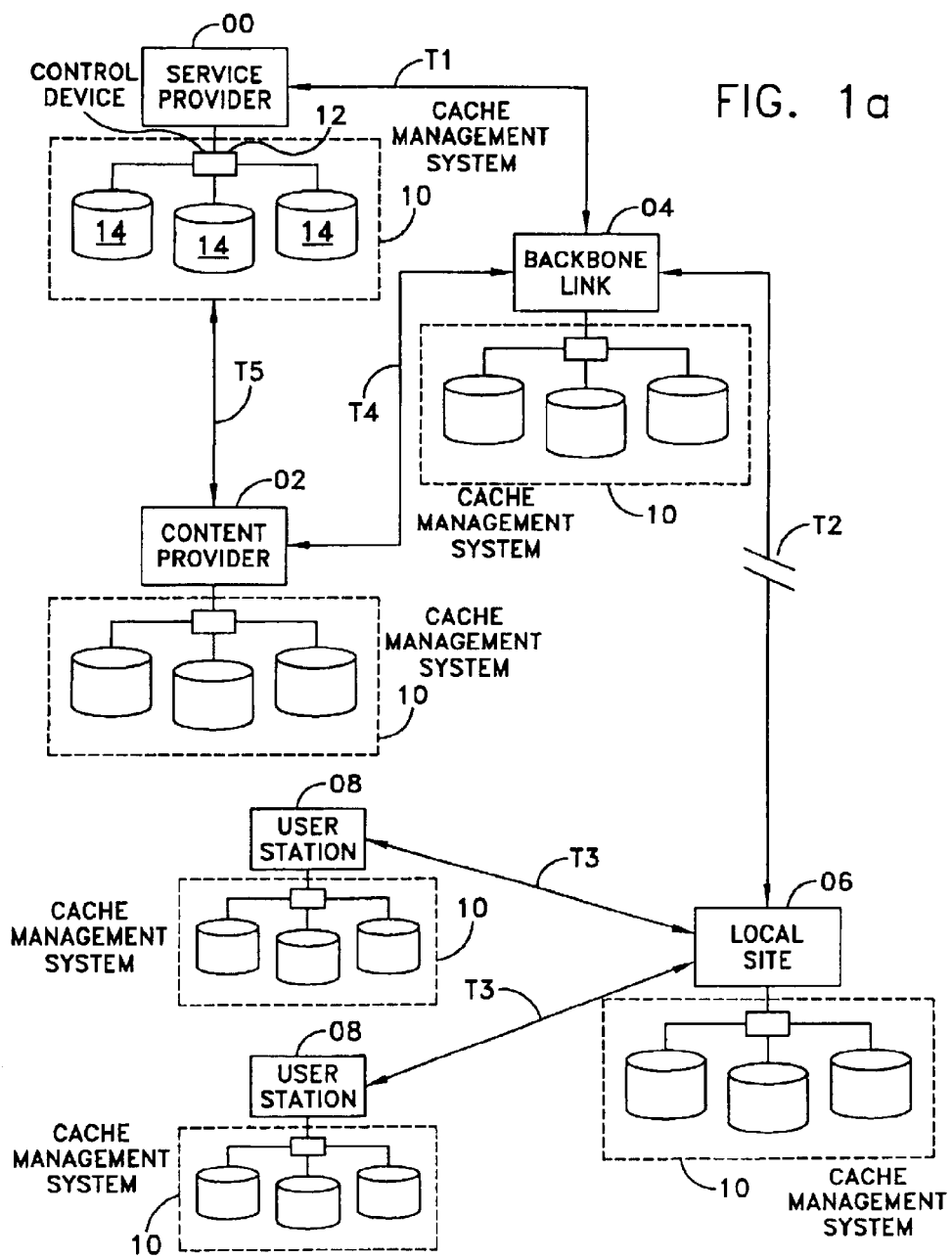
FIG. 1a is a schematic drawing of various sites on a network using the present invention.

FIG. 1a depicts a number of network sites or data nodes using the present invention. In a preferred embodiment, cache management system 10 includes a control device 12 and storage units 14. Control device 12, in this preferred embodiment, includes firmware that executes the logic of the present invention and acts as a cache memory manager for the cache memory management system. A cache management system 10 is shown in FIG. 1*a* as being installed at various sites on an Internet network. For purposes of illustration, a service provider site 00, as one data node, is shown connected by transmission media T1 to a backbone link site 04. One or more backbone link sites 04, as another data node or other data nodes, may be used for sending and receiving messages through the network. Local site 06 is shown here as a data node connected to the network formed by one or more backbone links 04 via transmission media T2. Local site 06 might be a corporate firewall & gateway site connected to multiple user stations 08 as other data nodes inside an internal corporate network with a local area network as transmission media T3 or it could be a local service provider providing dial-up services to user stations 08 over transmission media T3. Also shown in this FIG. 1*a* is a content provider site 02 as yet another data node.

In one embodiment, as shown in FIG. 1*b*, the cache memory device 14 in a cache management system 10*a* comprises a single storage unit. The cache memory device 14 in the cache management system 10*b* comprises a large magnetic recording disk array, such as a redundant array of independent or inexpensive disks (RAID) in a single RAID system or multiple RAID systems installed at the site. A preferred embodiment might use even larger disk arrays such as one or more of EMC Corporation's (of Hopkinton, Mass.) Symmetrix™ disk array storage devices having as much as 1.1 gigabytes of storage for large backbone link sites 04, such as shown in cache management system 10*c* of FIG. 1*b*.

AS will be apparent to those skilled in the art, other types of fast random access storage media can be used as storage units 14, such as magneto-optical disks, or massive random access memory arrays. In whatever form, such storage devices act as cache memory devices that are coupled to the data network.

In a preferred embodiment, cache management system 10 can be scaled up or down in storage capacity to meet site requirements. Similarly, in a preferred embodiment of the present invention,control device 12 is the controller for the disk system, where such controller is also capable of executing software or firmware implementations of the logic of cache management system 10. However, as will also be apparent to those skilled in the art, the logic of cache management system 10 could also be executed by a web browser at the CPU contained in the send and receive user station 08 connected to the network, as illustrated by user stations 08 in FIG. 1*b*.

Returning to FIG. 1*a*, cache management system 10 can be used at any or all of the types of sites listed above. For example, if service provider site 00 is used to manage the websites for a number of content providers, service provider site 00 may have its cache management system 10 configured to use either a page cache management method or a data usage frequency cache management method. This could also be related to a charging system that the service provider uses for billing its content providers. Alternatively, cache management system 10 could be configured for a store-through cache management method if the content providers used most frequently rely heavily on the use of interactive forms.

Still in FIG. 1*a*, the administrator of backbone link 04 might prefer to configure its cache management system 10 to use page usage or data usage patterns for providing the best overall response times. As will be apparent to those skilled in the art, all of these administrative decisions and actions could also be done by an expert system dynamically.

Similarly, different sites might be configured differently. And also, within one site one set of configurations might apply to one subset of data and a different set to another subset of data.

Local site 06, however, might prefer to use a time-currency method of cache management. Transmissions over the Internet using the transmission control protocol/internet protocol (TCP/IP) protocol have date stamps indicating the time at which they were sent, as do many other types of network protocols. If the information being transmitted is stock quote data, it is subject to frequent changes during the hours a given stock exchange is open, but after the close of a trading day, the closing prices will be valid until the next day of trading on that exchange. If such web-pages are cached using a "least recently used" method, important stock price changes may not be brought to a user's attention until that particular web-page is flushed or replaced in the cache and requires refreshing from the source. A time-currency method of cache management can be configured to refresh certain pages with one frequency, say every 15 minutes, during trading hours for a given exchange, and with another frequency, say until start of trading the next trading day, once the exchange has closed.

A local site 06 as shown in FIG. 1*a*, might also prefer to use a data usage pattern or even a pre-fetch method of cache management. This is particularly so where local site 06 is a corporate firewall/gateway site for an internal network. For example, if most of the internal users are likely to request pages from the same website, when they first log on, cache management system 10 at local site 06 could be configured to pre-fetch web pages from the requested site each time an internal user logs on and those pages are not already in cache storage. Or, data usage patterns could be tracked and used to manage cache management system 10 on that basis. To illustrate this, if users of a financial journal web page habitually go to a stock quote site when they finish the financial journal pages, this pattern can be combined with pre-fetching of the stock quote pages every time the financial journal pages are fetched. This, in turn, might be coupled with security provisions if access to such pages are to be limited to authorized users only.

When local site 06 is a firewall/gateway site to an internal corporate network, having a number of user sites 08 for its employees, these forms of usage based cache management may be more effective. There may be a greater commonality of interests, and hence data usage among the employees of a corporation, than there would be amongst a disparate grouping of unrelated users.

When local site 06 is a local service provider of dial-up Internet connections for a number of disparate user sites 08, different types of data usage patterns might be used to manage the cache and charge for services.

Still in FIG. 1*a*, content provider site 02 might have still another subset of cache management methods that would work best for it.

Figure 2A:
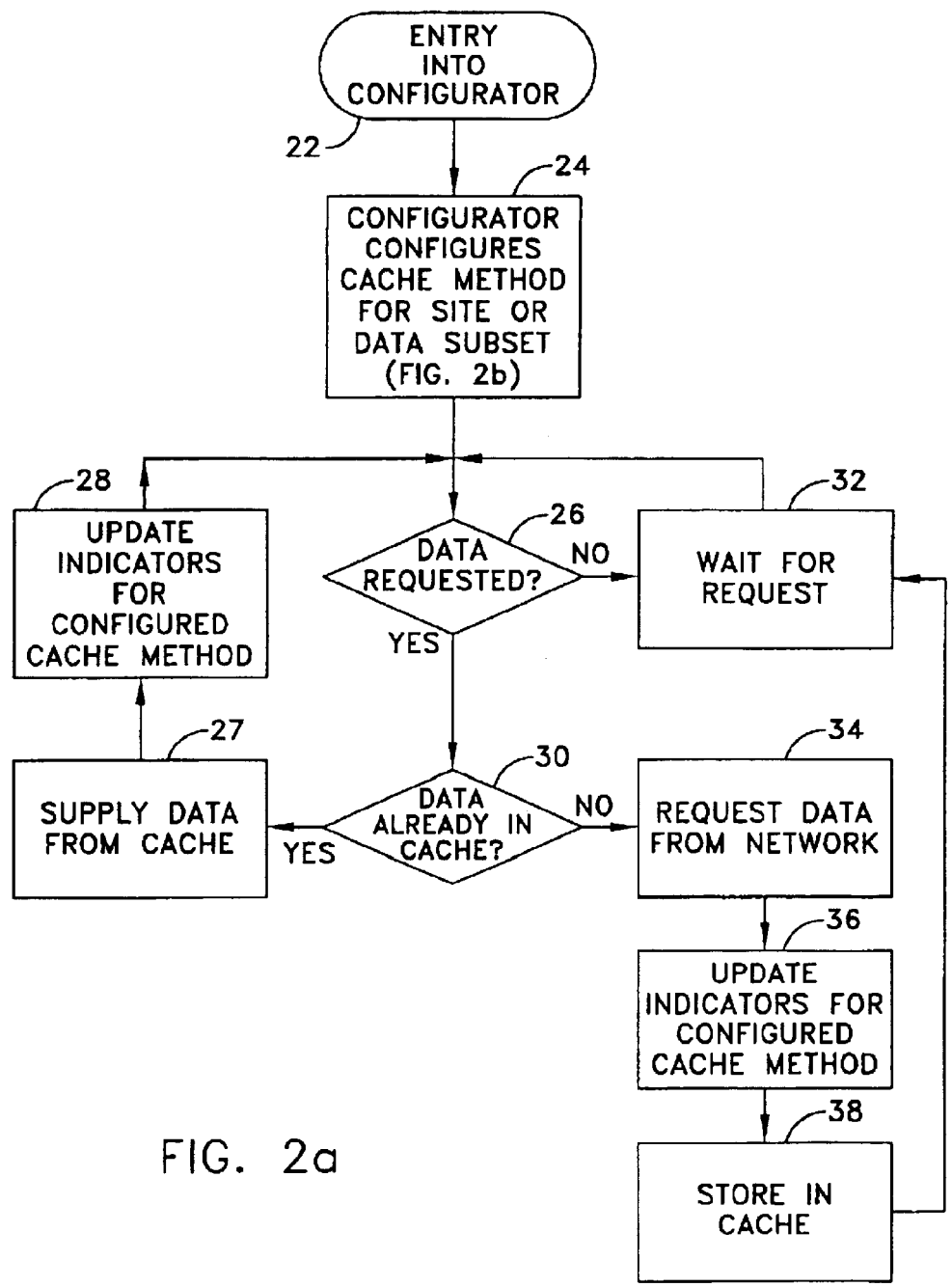
FIG. 2a is a flow diagram that depicts the operation of configurator of the present invention.

Turning now to FIG. 2*a*, an overall flow diagram of the present invention is shown. As shown at step 22, an initial entry is made to a configurator of the present invention that acts as a cache memory manager. At step 24, the configurator establishes the parameters and other indicators which may be needed by the cache management method(s) selected by the site. As will be apparent to those skilled in the art, a number of methods can be used to indicate which of several options has been selected. In one preferred embodiment, a user supplying the appropriate password might interact with cache management system 10 at each startup or reboot of the site or of a web browser at the site. The options selected by the user may then be indicated by settings or switches in cache management system 10. For simpler cache management algorithms, this may be all that is required.

However, for more complex algorithms, scripts can be prepared for the configurator, supplying additional details of user criteria. Examples of these latter algorithms, with illustrative pseudo-code are shown in FIGS. 11 and 12.

In an alternative preferred embodiment, the methods to use for cache management can be specified when cache management system 10 is installed at a site.

In yet another embodiment, the methods to be used for cache management at one site could be specified by messages transmitted to it from another site. This is an example of monitoring operations that response to received messages to control method selection. As another example, the monitor used for cache management could response to messages transmitted to it by a program or script running at the same site, such as a usage pattern analyzer. For example, such a usage pattern analyzer might track the statistics related to the likelihood that a type of page will already be in the cache when requested. If two methods of cache management are used at the site, pre-fetch for some subsets of data and least recently used (LRU) for others, a pattern analyzer might calculate from history data that the probability of pre-fetch data types being in the cache is 0.5 versus a lower probability for LRU data. In this instance, preferential treatment would be given to the pre-fetch data when deciding which type should be replaced with new data. This is an example of a monitoring operation and automatic response to the monitored conditions.

Figure 2B:
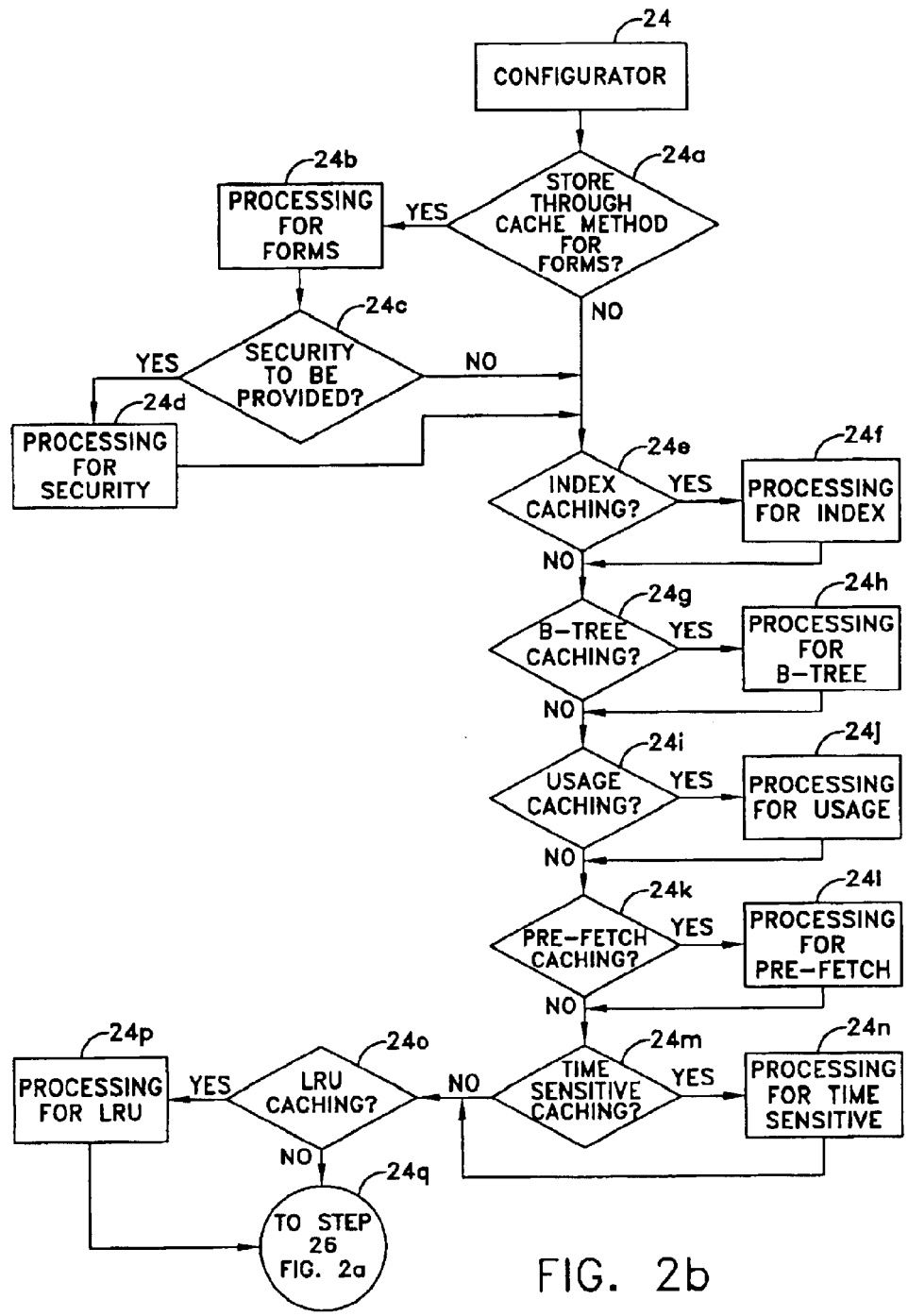
FIG. 2b is a more detailed flow diagram of the operation of the configurator of the present invention.

Referring now to FIG. 2b, the overall logic of the configurator of the present invention is shown. Here, step 24 from FIG. 2a is expanded to show the logic of the configurator. The logic of the configurator, which acts as a selector means for selecting one cache memory management method, is essentially a series of blocks, for analyzing the data supplied by the operator or by a script or a parameter list or a configuration message. Where a processing block is shown in FIG. 2b, those skilled in the art will recognize that different types of setup and initialization are being performed in each process block. Switches may be set, addresses or indexes initialized and so on. The configurator, at decision block 24a checks to see if forms will be handled in a storethrough manner (as described below.) If yes, processing needed to effectuate that is performed at step 24b and the configurator proceeds next to decision block 24c to see if data security is to be provided. If yes, processing for that is done at step 24d. As will be apparent to those skilled in the art, various types of protection schemes could be implemented for data that will be stored in the cache, from a simple scheme, such as password protection, to more elaborate protections such as encryption.

Returning to the flow in FIG. 2b, the system checks, at decision block 24e, to see whether any kind of indexing cache management method is selected. If it is, processing for the indexing method is done at step 24f. Next, the system determines whether a B-tree structure cache management method will be used, at decision block 24g. If so, processing for that is done at step 24h. Proceeding with FIG. 2b, at decision block 24i the configurator checks to see if a usage based cache management method is selected. If so, step 24j processes the usage based cache management method. Still going through FIG. 2b, at decision block 24k, the configurator checks to see whether any pre-fetch cache management method option has been selected. The processing at step 24l might include the initial use of a web-crawler or robot to fetch initial pages. (See description below for further discussion.)

At decision block 24m in FIG. 2b, the configurator checks to see whether any time sensitive method of cache management has been selected. If it has, the configurator may analyze scripted data or parameter data to initialize the values to be used. (See below for use of scripts to supply such data.)

And lastly, in FIG. 2b, the configurator checks at step 24o to see if a least recently used cache management method is selected. If it has, then processing associated with it is done at step 24p. If no method has been selected, the configurator can institute a default method, such as LRU. Finally, the configurator logic returns to step 26 in FIG. 2a, to proceed with the next tasks.

Now in FIG. 2a, once the cache methods selected for the site have been configured, the present invention follows the general flow depicted. At decision block 26, the configurator asks whether data has been requested. If not, the present invention enters a wait state at step 32, until a request comes in. As will be apparent to those skilled in the art, an alternative embodiment could create a task or subtask that is activated only when data requests are made and is suspended at other times. As will also be apparent the configurator, in step 26, monitors data requests at the data node. When data is requested it initiates operations by the which the request is processed.

Again in FIG. 2a, if data has been requested, the configurator checks at decision block 30, to see if the data is already in the cache. Depending on the cache management system used, this step may require either more or less time than existing systems. If B-tree or indexed caching methods have been selected, this step may be faster than existing systems. If time-sensitive methods have been selected, this step may take longer than existing systems.

If the data requested, usually a web page from a website, is already in the cache, in this example, storage units 14, the configurator proceeds to step 27 to supply that data from storage units 14 in answer to the request and then to step 28, to update any indicators associated with the configured cache management method. Ultimately, it will proceed to step 32, and wait for the next request.

If, in FIG. 2a, at decision block 30 it is determined that the data is not already in the cache (here, in storage units 14), a request will be made to fetch the data from the network at step 34.

At step 36, depending on the cache management method configured, the indicators, if any, for it will be updated. As will be described later, if an indexing method is used for cache management, the index address for storing this data might be computed at this point, if needed, to reflect a new piece of data. Then, at step 38, the data is stored in the cache, storage unit(s) 14. It should be noted here, that if the data is not found because of a failure in storage unit 14, this does not present a critical reliability problem, since the data can simply be requested from the network until the failing storage unit 14 is replaced or repaired.

Figure 3:
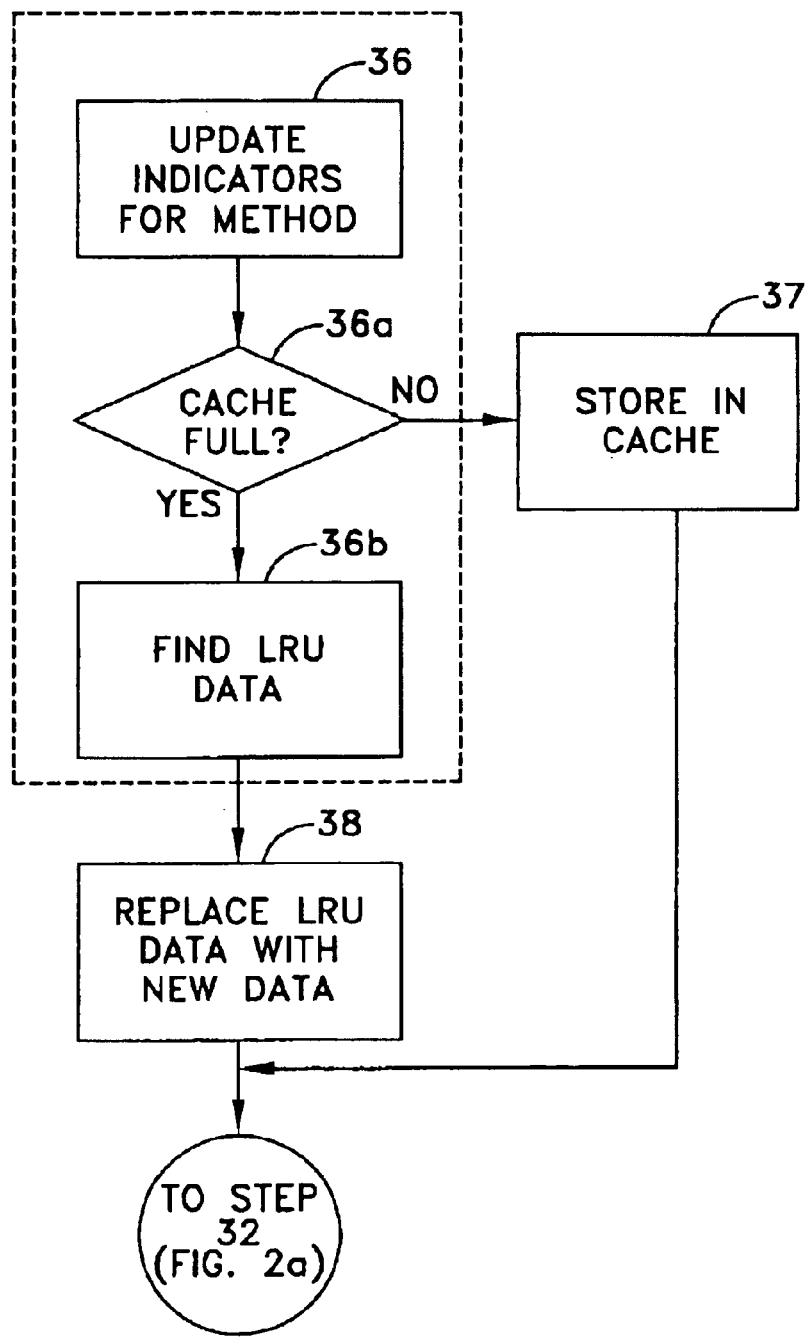
FIG. 3 is a flow diagram of a least recently used cache management method used in the present invention.

Turning now to FIG. 3, a simple flow diagram of a least recently used (LRU) method of cache management is shown. When a new request comes in and the cache is full, as indicated at step 36a, in FIG. 3, the system finds the least recently used (LRU) data at step 36b and replaces it with the new data at step 38. Then the system returns to step 32 in FIG. 2a, to wait for the next request.

Figure 4:
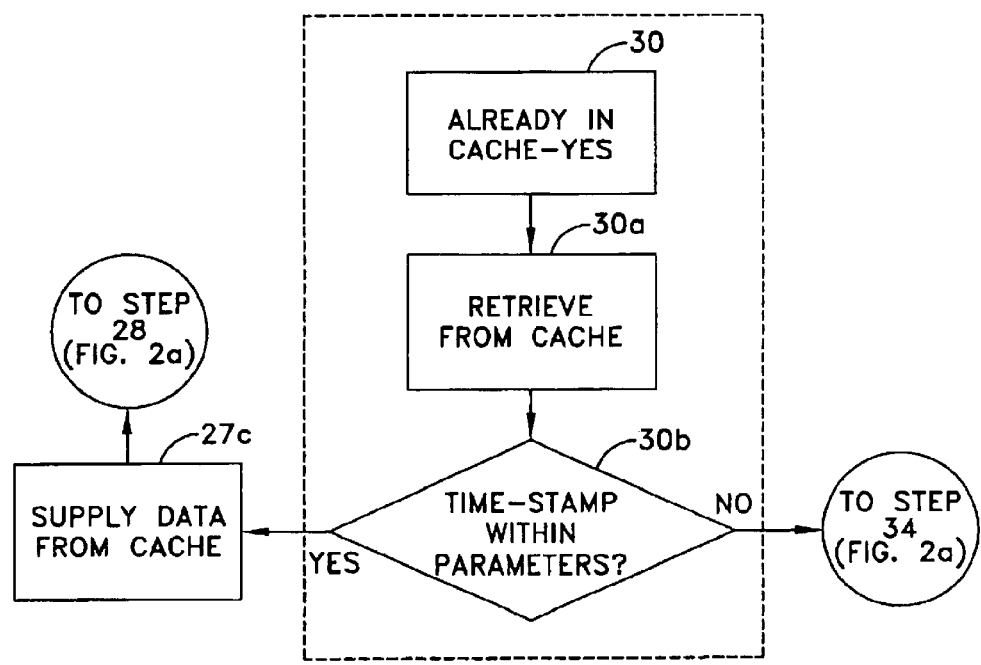
FIG. 4 is a flow diagram of a time-sensitive method of cache management used in the present invention.

FIG. 4, by contrast, outlines part of the processing for a time sensitive cache management method. There, once it is determined at decision block 30 that the data requested is already in the cache storage unit 14, it is retrieved from storage unit 14 at step 30*a*. Then it is checked at step 30*b* to see if the time-stamp on the found data is within the time-stamp parameters configured for this method of cache management. If it is, then the system provides that data in answer to the request at step 27*c* and returns to step 28 in FIG. 2*a*. If the data is not within the time-stamp parameters, a new, fresh copy is requested from the network by going to step 34 in FIG. 2*a*.

An example of time sensitive parameters that can be verified in this way is shown in FIG. 12. There scripted parameters CC are specified to indicate that pages are to be kept fresh during the trading hours of a stock exchange. In this example, the opening hours are said to be 1000 hours and the closing hour 1600 hours. During that time, the pages should be refreshed every 15 minutes, according to the scripted amount for value 1. Pseudo-code DD shows how this might be checked at decision block 30*b* of FIG. 4.

A simple variation of the time-sensitive method might include a request that nothing cached be out of date more than some specified period of time. Very little network traffic is generated by simply requesting the version number or creation data of a web page, instead of the entire page or site.

Figure 5:
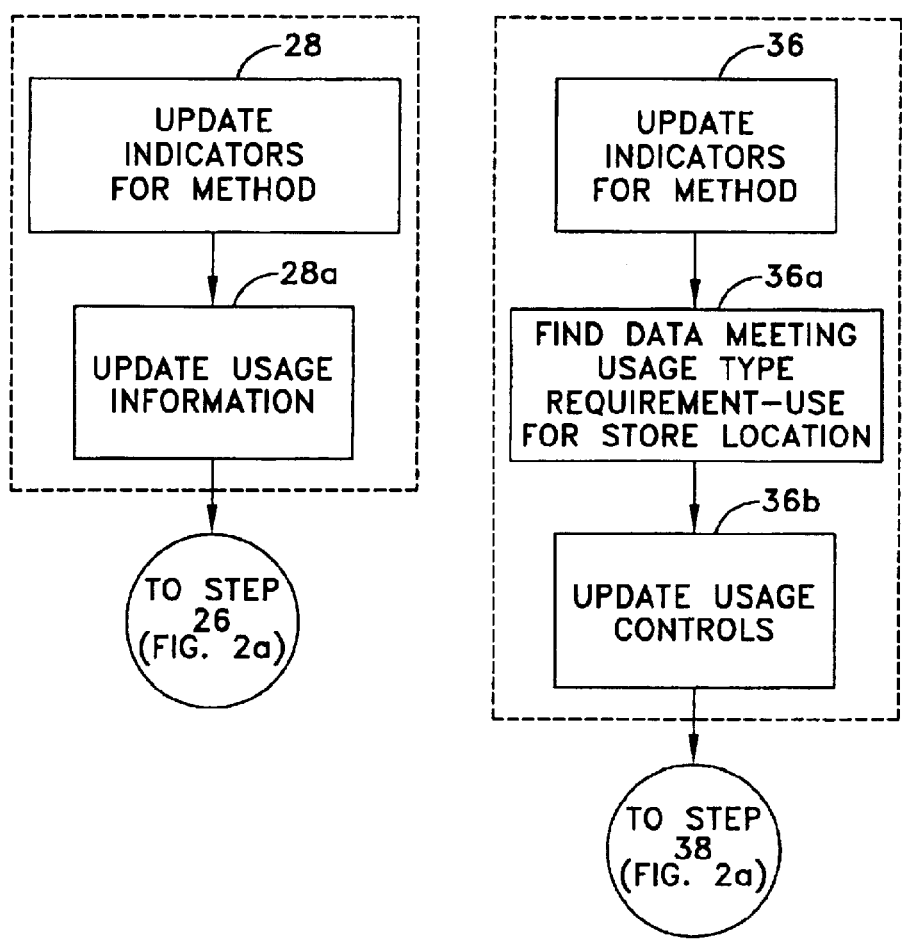
FIG. 5 is a flow diagram of a data usage cache management method used in the present invention.

In FIG. 5, a flow diagram of a usage-based cache management system 10 is shown. On the Internet, data is found by means of Uniform Resource Locators (URL) addresses. A significant amount of information about usage is thus contained merely in the address of a site. AS shown in FIG. 13, for example, for domain names, there are several standardized suffixes: com, edu, gov, miu, net, and org. These stand for: commercial, educational, government, military, network service provider, and nonprofit organization, respectively.

To illustrate usage based management, a company that markets products to educational institutions might want to give preferential treatment to all educational sites requested by the company's employees. web pages retrieved from sites having the suffix .edu in their domain names, might be stored with preferential treatment in storage unit 14, so that these pages will not be replaced when the cache is full unless the cache is completely filled with .edu pages. Thus, even though other sites might be more or less frequently used, over time, a cache management system configured in this way will tend to give better response times for requests for .edu pages. As shown in FIG. 5, at step 36*a*, the system configured to use this method of cache management will look for stored data that meets the "not an .edu page" usage requirement to determine where to store a newly retrieved page.

As will be apparent to those skilled in the art, the above use of standard Internet suffixes is illustrative only. Any of a number of other indicators, such as Uniform Resource Locators (URLS) or the identity of the requester, for a few examples, could also be used in connection with a usage based cache management system 10.

Alternatively, it is also possible that a site might want to track usage first, to establish data patterns by domain name suffix. In FIG. 5, this is illustrated at steps 28*a* and 36*b* where usage information is updated. This could be as simple a process as tracking the number of uses of each type of suffix over some specified period. The information gathered from this could be used to change the priorities of caching and replacing data. Other types of usage patterns that might be tracked could relate to images or sound files being referenced by a web page. FIG. 14 identifies some of the types of image and sound files that can be included in or referred to in a web page.

Figure 6:
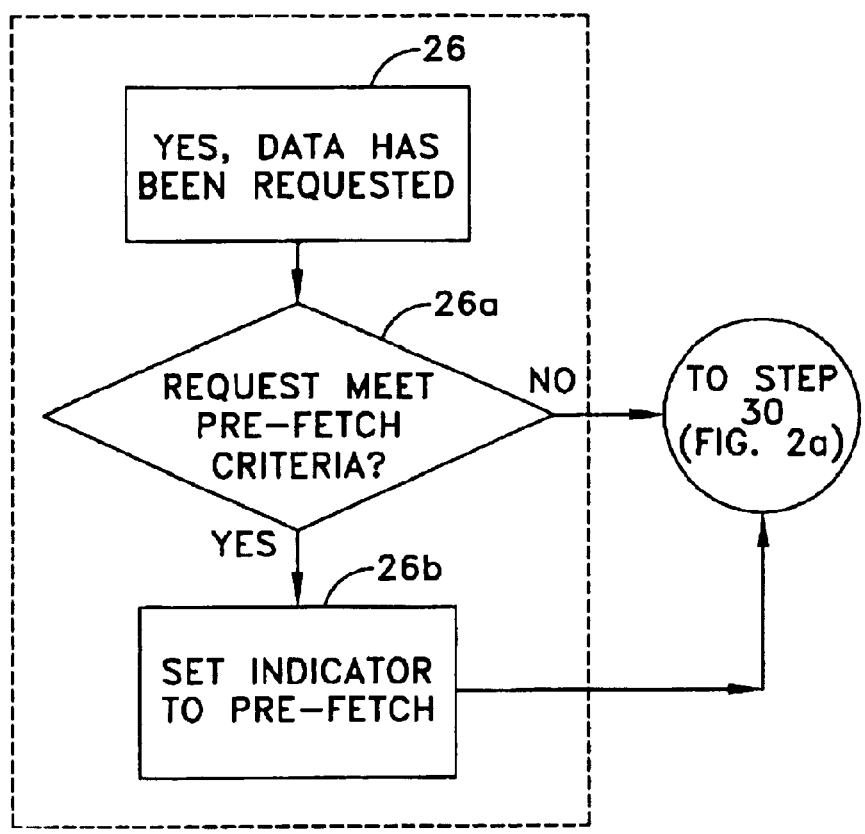
FIG. 6 is a flow diagram of a pre-fetch cache management method used in the present invention.

In a similar way, information about the request can also be used to pre-fetch data from certain pages or websites. For example, as shown in FIG. 13, information about a particular web-site may be as specific as a "spot" location. A site having a large number of pages may have them individually addressable using the spot address. If a usage study indicates that users of a particular website almost always go from page 1 to pages 14–16, then this information could be configured into the cache management system as shown in FIG. 6. If a request meets some pre-fetch criteria, as determined at step 26*a* in FIG. 6, then an indicator can be set at step 26*b* to pre-fetch some specified pages if they are not already in storage unit 14. These indicators could be automatically checked whenever a request is made from the network for data not in the cache.

Pre-fetching might also be appropriate for large files such as image and sound files. As illustrated in FIG. 14, a hypertext reference "s1" to a sound file might cause the sound file to be pre-fetched when the page containing hypertext reference "s1" is retrieved. If frequent accesses are made by all the users at one site to this web page and all of its hypertext links, then pre-fetching the files referenced in the hypertext links will improve response times for such large files as sound, image and video.

Figure 7:
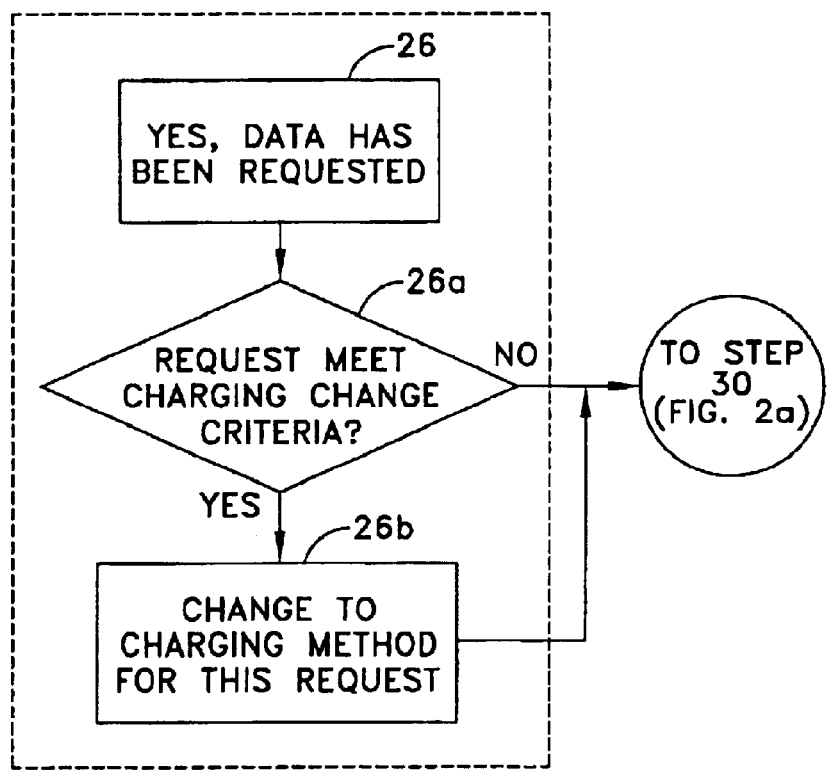
FIG. 7 is a flow diagram of a charging cache management method used in the present invention.

In much the same way, charging methods of cache management can be created according to the method and apparatus of the present invention. An Internet service provider may want to charge its customers differently for different types of access. For example, requests for certain classes of domain names could be charged for differently. Requests for ".com" or commercial domain names, might be charged a higher rate than requests for ".org" nonprofit sites. If charges are also based on the need to refresh the cache, the system could track when a request is made that will cause a request to be made to the network (a refresh request). This is illustrated in FIG. 7, where a determination is made at step 26*a* as to whether or not the new request meets the criteria for changing the charging method. Thus, if the previous three requests had been for ".com" sites, and this request is for a ".org" site, and that causes the system to issue a request to the network, the charge rate would be changed to that for ".org" and the timed amounts updated.

As will be apparent to those skilled in the art, this method of cache management could also be combined with the time-sensitive cache management methods illustrated in FIG. 4. Thus, accesses made during the hours a given stock exchange is open could be billed at a higher rate than those made after trading hours. In yet another example of a time-sensitive cache management method, users could be charged for the "freshness" of the web pages fetched. If the user wants to insure that all pages of a certain type are less than 7 hours old, a premium charge could be associated with those requests.

Figure 8:
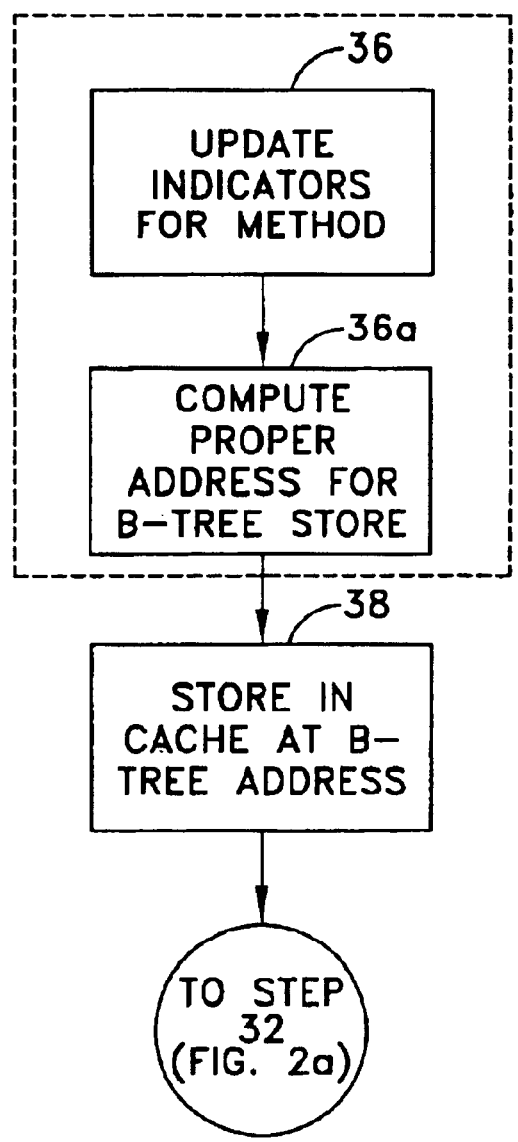
FIG. 8 is a flow diagram of a B-tree cache management method used in the present invention.

In FIG. 8, a flow diagram is shown for using a B-tree cache management method. B-trees are known to be a fast way to organize data stored on a disk, so that the disk can be searched quickly. In a preferred embodiment of the present invention, if large quantities of storage units 14 are used as part of cache management system 10, the use of B-trees may be advantageous for performance purposes. When a new request will result in a store to storage unit 14, the present invention calculates the proper address for the B-tree store at step 36*a* as shown in FIG. 8. In B-trees, a search tree is created of degree n, such that the root node has degree greater than or equal to 2 and every nonterminal node other than the root has degree k, where n/2 is greater than or equal to k and k is greater than or equal to n.

Figure 9:
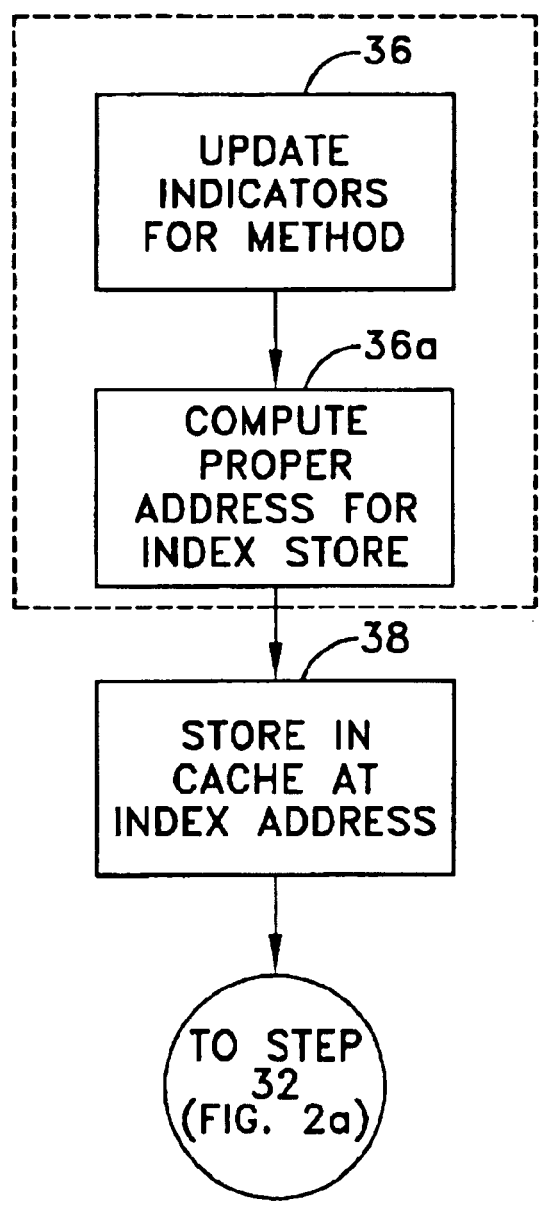
FIG. 9 is a flow diagram of an indexed cache management method used in the present invention.

An indexed method of cache management is shown in FIG. 9. A very simple index might use the domain names and internet is addresses for allocating space and addresses within storage unit 14. As indicated in FIG. 9, when a new piece of data comes in, this index can be used to compute, at step 37, the proper address for storing the data in storage unit 14, the cache. When the data is stored in the cache's storage unit 14 at step 38, it is stored at the computed location.

An alternative embodiment of this indexing method might organize the index by the names of frequently accessed image, sound and video files as a top level priority, with other domain names and addresses having a second level priority. In this approach, preference would be given to those files (image, sound or video) that are most likely to require longer transmission times. When data in the cache is to be replaced, these longer files are not replaced except by other long file types and only after the secondary file types have been replaced.

A number of existing indexing schemes already exist on the Internet for use by programs known as search engines, spiders, web crawlers or robots. When a content provider places a web page on the world wide web, it may also include some index terms in the headers for the website. These indexes are picked up by the search engines and web crawlers when a search request is made over the Internet. An alternative preferred embodiment could use one of these indexing methods to establish the index for the cache management according to the method and apparatus of the present invention. One or more of these web crawlers or robots could also be used in another alternative preferred embodiment to do some or all of the pre-fetching referred to above.

Still another form of indexing or pre-fetching that could be used in an alternative preferred embodiment of the present invention is the technique known as mirroring. If users at a local site are constantly accessing a large website located outside the country, the cache management methods of the present invention might create a local mirror of that site in storage units 14, and use the protocols provided by the source for updating the mirror image. These normally include an initial transfer of all data using a file transfer protocol (FTP)—like protocol, and then regularly scheduled updates that cause any changes made at the source site to be transferred to the mirror. Where the local site has a large amount of storage available for storage units 14, the present invention could include several mirrors in the cache as well as other indexes. Additionally, service providers could offer supplying the mirror files as one of their services. In this approach, updates would be sent to a local site by the service provider as they occur and without being solicited by a file transfer request from the local cache management system 10.

Figure 10A:
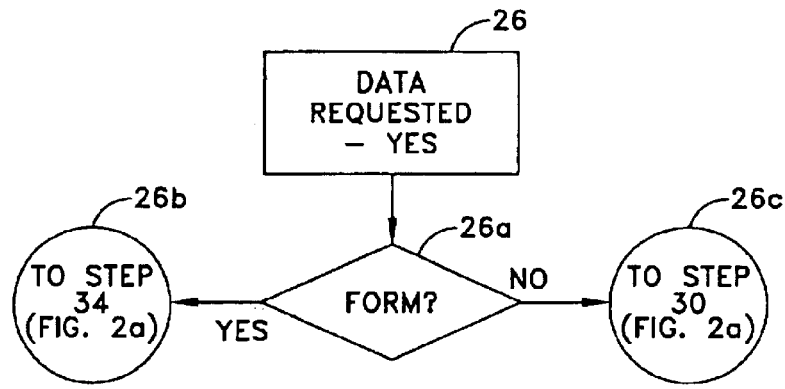
FIG. 10a is a flow diagram of a store-through method of cache management used in the present invention.
Figure 10B:
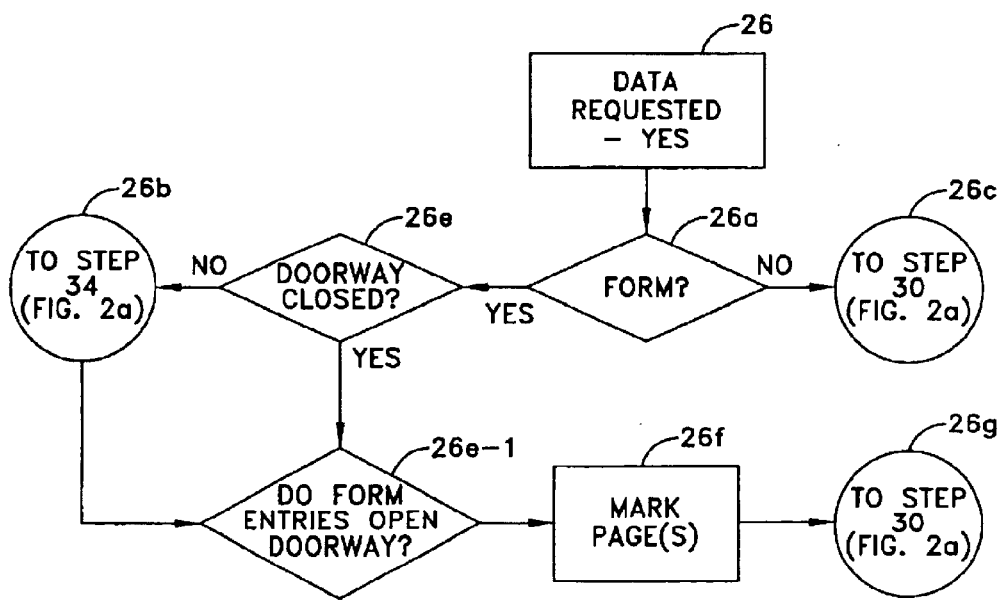
FIG. 10b is a flow diagram of a data protection method according to the present invention.
Figure 15:
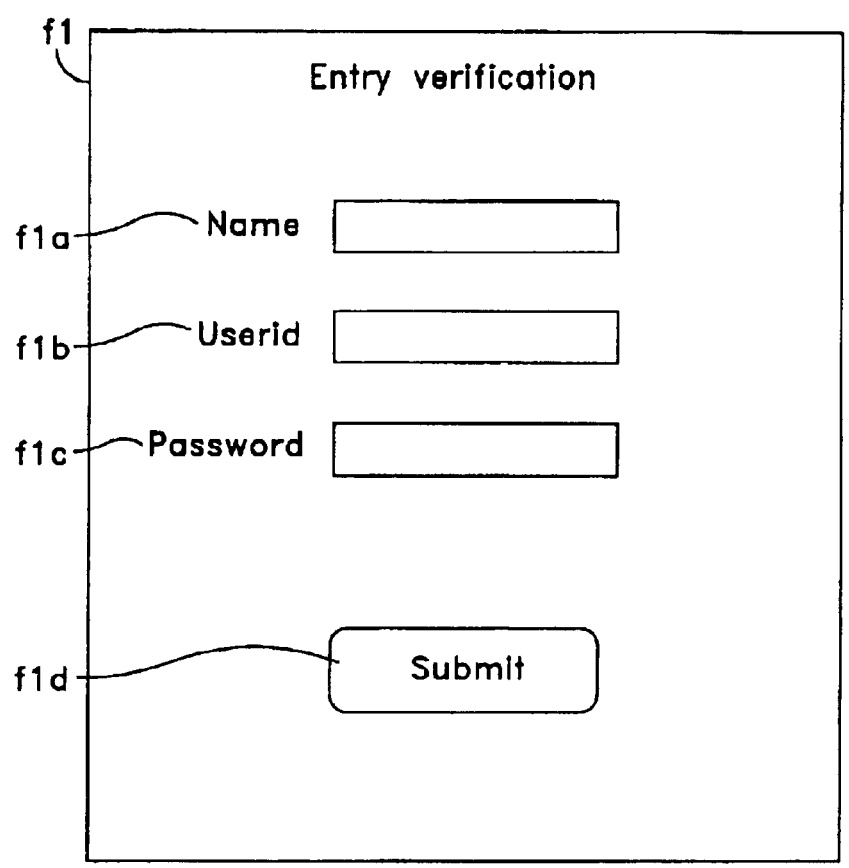
FIG. 15 is a schematic drawing of a form used in the present invention.

In FIGS. 10a and 10b, a store-through method of cache management is shown for use with interactive forms such as form f1 shown in FIGS. 14 and 15. Using any of a number of existing HTML interpreters or parsers (programs that analyze the HTML text present on a page to determine its contents), a data request is checked for the presence of forms at step 26, as shown in FIG. 10a. If the data is a form, no check is made to see if it is already in the cache, since it is presumed that forms must be filled out freshly each time. Thus, at step 26a, the check is made to see if the data contains a form. If it does, the method proceeds to step 34 (of FIG. 2a) and a request is made that a new copy be transmitted. If the request does not contain a form, the method proceeds to decision block 30 (in FIG. 2a) to see if the data is already in the cache.

In the example shown in FIG. 15, where the form is a userid and password verification form, each user at a local site would fill in a different userid and password, hence storing one user's filled out form in the cache would be counterproductive for the other users. Other information that does not contain forms will be stored through, that is, placed in the cache according to any other method(s) configured.

In another preferred embodiment, security "doorways" are provided in cache management system 10, as shown in FIG. 10b. Since such security is likely to include the use of some interactive form, the processing shown in FIG. 10a is further modified to perform the logic shown in FIG. 10b. Here, once it is established that a form is being transmitted, at step 26a, a check is made at step 26e to see if the form's contents "open" the doorway. A check is made at step 26e to see if the doorway is closed. If it is, at step 26e-1 the entries from the form are checked to see if they are valid for opening the doorway. If they are—that is, the userid and password have been accepted as valid, in this example—then that page and those below in the index hierarchy are so marked at step 26f to enable this userid to store and access data in the cache. Once the "doorway" has been opened, the operation of the method proceeds to step 26g to exit to step 30 (in FIG. 2a) to see if the protected data is already in the cache. On the other hand, if the form's contents do not open the doorway, that is the userid and password have not been accepted as valid in this example, then the method proceeds via the "NO" output from step 26e-1 to step 26b, and from there to step 34 in FIG. 2a where it then proceeds in accordance with the flow diagram of FIG. 2a.

The above described security provisions will work with existing Internet protocols such as http. As will be apparent to those skilled in the art, if the protocols change, or a different protocol is used, the security provisions may need to change as well. In anticipation of such changes, a preferred embodiment would perform the security checking in the cache management system 10, rather than in the applications software used at the site, to minimize the need for other changes.

As will be apparent to those skilled in the art, this or similar forms of security and protection, including such steps as encryption/decryption for certain pages stored in the cache, may be required by service and content providers who offer to sell goods and services over the internet.

In a preferred embodiment, the logic of the present invention may be embodied in program code written in the C language, either as a software program stored in storage units 14 and executing in control device 12 of cache management system 10, or as firmware executing as part of control device 12 of cache management system 10. As will be apparent to those skilled in the art, other programming languages, such as PERL, or Pascal-or C++, or assembler, to name only a few, could be used instead. As mentioned earlier, while it is preferred that the code execute as part of control device 12 of cache management system 10, it could also be developed to execute as part of a web browser or server manager located at a local site.

FIG. 1c depicts the organization of a typical cache management system 10 and will be apparent to a person of ordinary skill in the art from the previous description. Specifically the cache memory management system includes a control device or cache memory manager 12 and a storage unit or cache method device 14. The cache memory device 14 includes a cache method storage device 100 that stores the various cache memory management methods such as those described as being stored in a cache method storage module 100, such as the store through index caching and other methods shown in FIGS. 3 through 12. The cache memory manager 12 includes a method selector module 101 that contains the various controls outlined in FIG. 2b, that select a cache memory module and initiate its processing. A monitoring module 103 that performs the functions of step 26 in FIG. 2a. A command send and receive module 104 enables a device that will allow information to be sent to other data nodes or received from other data nodes for the purpose of establishing configurations within the specific data node, as previously described.

Simplified embodiments of the present invention could also be implemented as UNIX® of Unix System Laboratories, Inc or Unix shell or Apple MacIntosh® of Apple Computer, Inc. scripts that execute in a server operating as one of the links in the network.

As will also be apparent to those skilled in the art, the present invention could also be implemented in hardware circuits using application specific integrated circuit (ASICS) or gate arrays.

While the examples given here are drawn primarily from the Internet network, it will be apparent to those skilled in the art that the apparatus and method of the present invention can be applied to other networks, and similar applications, as well.

Those skilled in the art will appreciate that the embodiments described above are illustrative only and that other systems in the spirit of the teachings herein fall within the scope of the invention.

What is claimed as new and desired to be secured by Letters Patent of the United States is:

1. A cache management system at a data node in a data network with a plurality of interconnected data nodes for transferring data therebetween, at least two of the data nodes including a cache management system, said cache management system comprising:

A) a cache memory device coupled to the data network for storing at a plurality of different cache memory management methods, each cache memory management method providing a different method by which said data node communicates over the data network and B) a cache memory manager connected to said cache memory device including means for selecting one of the plurality of different cache memory management methods in said cache memory device at said data node thereby to control the manner in which said data node communicates over the network and wherein the cache memory management methods used at said data node and another data node on the data network are different.

2. A data node as recited in claim 1 wherein said cache memory manager includes a monitor for monitoring operations at a corresponding data node and said method selection means responds to said monitor.

3. A data node as recited in claim 1 wherein said cache memory manager includes a monitor at a corresponding data node for receiving commands from other data nodes and said method selection means responds to the received commands.

4. A data node as recited in claim 3 wherein one of said cache memory management methods is a least recently used cache management method.

5. A data node as recited in claim 3 wherein one of said cache memory management methods is a data usage cache management method.

6. A data node as recited in claim 3 wherein one of said cache memory management methods is a store-through cache management method.

7. A data node as recited in claim 3 wherein one of said cache memory management methods is a pre-fetch cache management method.

8. A data node as recited in claim 3 wherein one of said cache memory management methods is an indexing cache management method.

9. A data node as recited in claim 3 wherein one of said cache memory management methods is a B-tree cache management method.

10. A data node as recited in claim 3 wherein one of said cache memory management methods is a charging cache management method.

11. A data node as recited in claim 3 wherein said cache memory device stores at least one of last recently used, data usage, store-through, pre-fetch, indexing, B-tree and charge cache memory management methods.

12. A data node as recited in claim 11 wherein said cache memory manager includes a monitor for monitoring operations at a corresponding data node and said method selection means responds to said monitor.

13. A data node as recited in claim 11 wherein said cache memory management includes a monitor for receiving commands from other data nodes and said method selection means responds to the received commands by selecting one of the cache memory management methods in said cache memory device in a corresponding data node.

* * * * *